US012080435B2

(12) United States Patent
Heibel et al.

(10) Patent No.: US 12,080,435 B2
(45) Date of Patent: Sep. 3, 2024

(54) METHODS OF MANUFACTURE FOR NUCLEAR BATTERIES

(71) Applicant: Westinghouse Electric Company LLC, Cranberry Township, PA (US)

(72) Inventors: Michael D. Heibel, Broomfield, CO (US); Cenk Guler, Irwin, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 839 days.

(21) Appl. No.: 17/125,356

(22) Filed: Dec. 17, 2020

(65) Prior Publication Data

US 2022/0199272 A1 Jun. 23, 2022

(51) Int. Cl.
*H01S 4/00* (2006.01)
*G21C 21/02* (2006.01)

(52) U.S. Cl.
CPC .................................... *G21C 21/02* (2013.01)

(58) Field of Classification Search
CPC .................................. G21C 21/02; G21H 1/02
See application file for complete search history.

(56) References Cited

U.S. PATENT DOCUMENTS

| | | | |
|---|---|---|---|
| 2,930,909 A | 3/1960 | Lieb | |
| 3,767,947 A | 10/1973 | Adler et al. | |
| 3,909,617 A | 9/1975 | Jones et al. | |
| 3,934,162 A | 1/1976 | Adler et al. | |
| 4,097,654 A | 6/1978 | Guazzoni | |
| 5,260,621 A * | 11/1993 | Little .................... | H01L 31/041 136/202 |
| 5,721,462 A | 2/1998 | Shanks | |
| 6,043,423 A | 3/2000 | Satomura | |
| 6,500,575 B1 | 12/2002 | Shiue et al. | |
| 7,491,881 B2 * | 2/2009 | Putnam .................... | G21H 1/12 136/243 |
| 8,487,392 B2 | 7/2013 | Spencer | |
| 9,006,955 B2 | 4/2015 | Batchelder | |

(Continued)

FOREIGN PATENT DOCUMENTS

| | | |
|---|---|---|
| CN | 102543238 A | 7/2012 |
| CN | 110444313 A | 11/2019 |

(Continued)

OTHER PUBLICATIONS

Search Report for corresponding Taiwan Application No. 110147525, dated Jun. 13, 2022.

(Continued)

*Primary Examiner* — Paul D Kim
(74) *Attorney, Agent, or Firm* — K&L Gates LLP

(57) ABSTRACT

Methods of manufacture for nuclear batteries are provided. The method comprises inserting a radiation source material into a cavity defined within a first component to form a radiation source layer. The first component comprises a first electrical insulator layer defining the cavity and a first casing layer disposed over the first electrical insulator layer. The method comprises contacting the first casing layer with a second casing layer of a second component to form an assembly. The second component comprises a second electrical insulator layer and the second casing layer disposed in contact with the second electrical insulator layer. The method comprises swaging the assembly to form the nuclear battery.

12 Claims, 5 Drawing Sheets

(56) References Cited

U.S. PATENT DOCUMENTS

| | | | | |
|---|---|---|---|---|
| 10,784,010 | B2 * | 9/2020 | Whitehead | G21H 1/00 |
| 11,289,757 | B2 | 3/2022 | Nemanick et al. | |
| 2011/0031572 | A1 | 2/2011 | Spencer et al. | |
| 2015/0083180 | A1 | 3/2015 | Lang | |
| 2015/0357068 | A1 | 12/2015 | Smith | |
| 2017/0309359 | A1 | 10/2017 | Whitehead | |
| 2019/0392961 | A1 | 12/2019 | Choi et al. | |
| 2021/0391092 | A1 | 12/2021 | Matthews | |

FOREIGN PATENT DOCUMENTS

| | | | |
|---|---|---|---|
| TW | 434927 | B | 5/2001 |
| WO | 2005001475 | A2 | 1/2005 |

OTHER PUBLICATIONS

International Search Report and Written Opinion for International PCT Application No. PCT/US2021/072958, dated Jun. 3, 2022.
International Search Report and Written Opinion for International PCT Application No. PCT/US2021/072228, dated Feb. 23, 2022.
Search Report for corresponding Taiwan Application No. 110141200, dated Oct. 4, 2022.

* cited by examiner

502 — IRRADIATING A PARENT ISOTOPE MATERIAL IN THE FIRST COMPONENT

↓

504 — INSERTING THE FIRST COMPONENT INTO THE CAVITY OF THE SECOND COMPONENT

↓

506 — CONTACTING THE FIRST RADIATION SHIELDING LAYER OF THE SECOND COMPONENT WITH THE SECOND RADIATION SHIELDING LAYER OF THE THIRD COMPONENT TO FORM AN ASSEMBLY

↓

508 — WELDING THE FIRST SHIELDING LAYER OF THE FIRST COMPONENT TO THE SECOND SHIELDING LAYER OF THE SECOND COMPONENT

↓

510 — SWAGING THE ASSEMBLY

↓

512 — ATTACHING A THERMAL HARVESTING DEVICE TO THE ASSEMBLY

FIG. 5

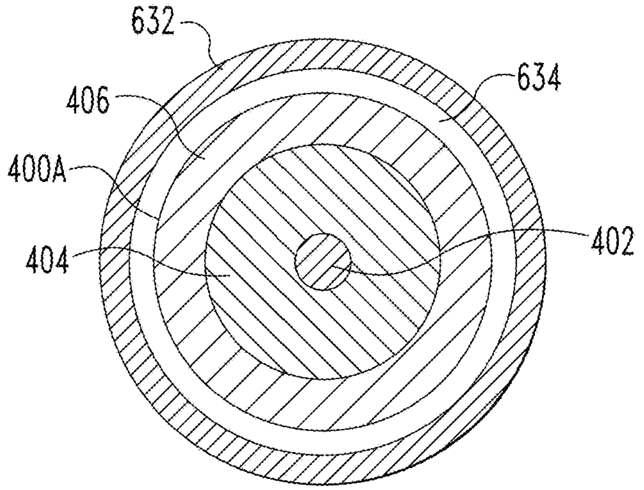

FIG. 6

METHODS OF MANUFACTURE FOR NUCLEAR BATTERIES

BACKGROUND

Radioisotope Thermal Generators (RTGs) produce heat and utilize thermocouples to convert the heat into electricity. Plutonium-238 has typically been used in RTGs as it has a desirable half-life of 87.7 years and Plutonium-238 emits alpha radiation that decelerates rapidly in the material surrounding the Plutonium-238 to produce heat. Additionally, Plutonium-238 produces essentially no gamma radiation and the deceleration of alpha radiation produces essentially no gamma radiation, which minimizes the radiation shielding needed to allow the Plutonium-238 powered RTGs to be used in close proximity to people and/or radiation-sensitive electronics. However, manufacturing RTGs with Plutonium-238 presents challenges.

SUMMARY

The present disclosure provides a method of manufacturing a nuclear battery. The method comprises inserting a radiation source material into a cavity defined within a first component to form a radiation source layer. The first component comprises a first electrical insulator layer defining the cavity and a first casing layer disposed over the first electrical insulator layer. The method comprises contacting the first casing layer with a second casing layer of a second component to form an assembly. The second component comprises a second electrical insulator layer and the second casing layer disposed in contact with the second electrical insulator layer. The method comprises swaging the assembly to form the nuclear battery.

The present disclosure also provides a method of manufacturing a nuclear battery. The method comprises irradiating a parent isotope material in a first component to form a radiation source layer. The first component comprises the parent isotope material, a first electrical insulator layer disposed over the parent isotope material, and a casing layer disposed over the first electrical insulator layer. The method comprises inserting the first component comprising the radiation source layer into a cavity defined within a second component to form a subassembly. The second component comprises a third electrical insulator layer defining the cavity and a first radiation shielding layer disposed over the third electrical insulator layer. The method comprises contacting the first radiation shielding layer of the second component with a second radiation shielding layer of a third component to form an assembly. The third component comprises a second electrical insulator layer and the second radiation shielding layer in contract with the second electrical insulator layer. The method comprises welding the first radiation shielding layer and the second radiation shielding layer together. The method also comprises swaging the assembly to form the nuclear battery.

It is understood that the inventions described in this specification are not limited to the examples summarized in this Summary. Various other aspects are described and exemplified herein.

BRIEF DESCRIPTION OF THE DRAWING

The features and advantages of the examples, and the manner of attaining them, will become more apparent, and the examples will be better understood by reference to the following description of examples taken in conjunction with the accompanying drawing, wherein:

FIG. 5 is a flow diagram for a method of manufacture of a nuclear battery according to the present disclosure.

FIG. 6 is a partial cross-sectional top view of the first component of the nuclear battery assembly of FIG. 4 in a removable container.

Figure 1:
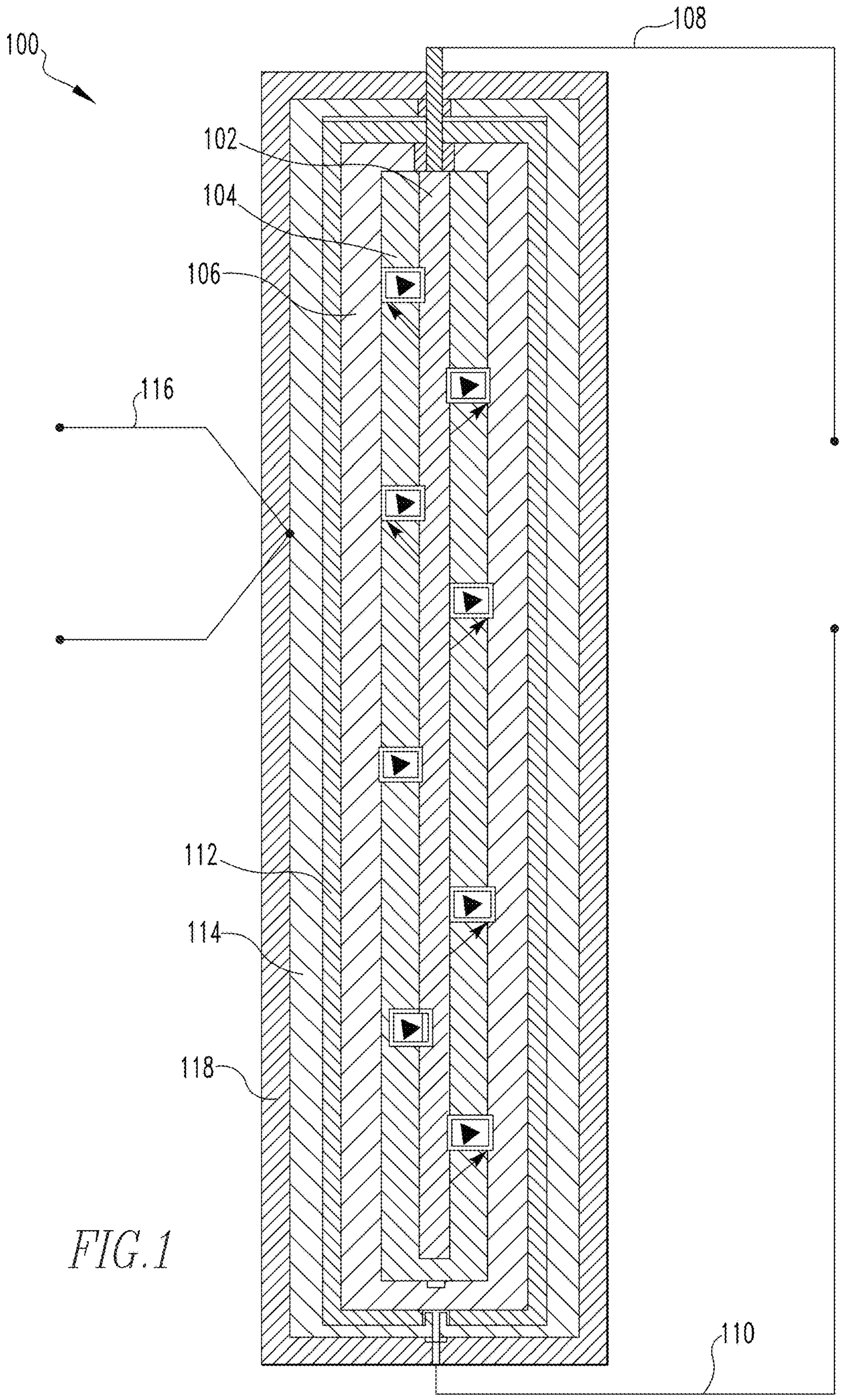
FIG. 1 is a partial cross-sectional side view of a nuclear battery according to the present disclosure.

The exemplifications set out herein illustrate certain examples, in one form, and such exemplifications are not to be construed as limiting the scope of the examples in any manner.

DETAILED DESCRIPTION

Certain exemplary aspects of the present disclosure will now be described to provide an overall understanding of the principles of the composition, function, manufacture, and use of the compositions and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

Typically RTGs only generate electrical energy from thermal energy produced by the deceleration of alpha radiation from plutonium-238. However, plutonium-238 can be an undesirable fuel. Additionally, beta emitting compositions were not previously used as beta radiation can produce Bremsstrahlung radiation emissions (e.g., gamma radiation) which can be undesirable and require an undesirable large radiation shielding layer. Further, it has been difficult to increase the power density of RTGs. Accordingly, the present inventors have provided methods of manufacturing nuclear batteries that can generate electrical energy directly from beta radiation emissions without the need to first create thermal energy from the beta radiation, increase power density of RTGs, and/or reduce electrical shielding requirements. In various examples the nuclear battery can generate electrical energy both directly from the beta radiation and from thermal energy. Furthermore, the methods of manufacturing nuclear batteries provided herein can reduce an operator's exposure to radiation.

Referring to FIG. 1, a nuclear battery 100 is provided. The nuclear battery 100 comprises a radiation source layer 102, a first electrical insulator layer 104, a casing layer 106, a first electrode 108, and a second electrode 110. In some examples, the nuclear battery 100 optionally comprises a second electrical insulator layer 112, a radiation shielding layer 114, a thermal energy harvesting device 116, and a thermal insulation layer 118.

The nuclear battery 100 can be configured as a battery plate, a rod, or other shape. In various examples, the nuclear battery 102 can comprise a single battery plate as shown in FIG. 1 or multiple battery plates (not shown). In the rod shaped configuration of the nuclear battery 100, each of the layers 102, 104, 106, 112, 114, and 118 can have the vertical cross section as shown in FIG. 1. The length of the rod can be controlled to produce a desired amount of electric power. The rod shape can be a spiral rod shape to minimize space required to achieve a desired power output.

The radiation source layer 102 comprises a composition configurable to emit beta radiation. For example, the radiation source layer 102 can comprises thulium, a thulium isotope, strontium, a strontium isotope, or a combination thereof. In certain examples, the radiation source layer 102 comprises a radioisotope that emits beta radiation. The radiation source layer 102 can be plate shaped or rod shaped. The radiation source layer 102 can be produced with a thickness based on the desired amount of beta radiation to be emitted. For example, the radiation source layer 102 can be 1 mm in thickness. The dimensions of the radiation source layer 102 can be sized to produce a required amount of electric power.

The first electrical insulator layer 104 is disposed over the radiation source layer 102. For example, the first electrical insulator layer 104 can be in direct contact with and surround the radiation source layer 102. The first electrical insulator layer 104 can comprise a composition and thickness suitable to provide a desired electrical resistance between the radiation source layer 102 and the casing layer 106. For example, the first electrical insulator layer can comprise a metal oxide. In various examples, the first electrical insulator layer can comprise magnesium oxide, aluminum oxide, diamond, or a combination thereof.

The casing layer 106 is disposed over the first electrical insulator layer 104. For example, the casing layer 106 can be in direct contact with and surround the first electrical insulator layer 104. The casing layer 106 comprises a composition and thickness configured to inhibit traversal of beta radiation (e.g., slow the beta radiation) through the casing layer 106. For example, the casing layer 106 can comprise a metal or a metal alloy, such as, for example, a metal with an atomic number of 13 or less, or a metal alloy with the primary metal having an atomic number of 13 or less. In various examples, the casing layer can comprise aluminum, an aluminum alloy, magnesium, a magnesium alloy, beryllium, or a beryllium alloy. In examples where the casing layer 106 comprises a composition with a metal comprising an atomic number of 13 or less, there can be a minimal, if any, Bremsstrahlung radiation produced due to the inhibition of traversal of the beta radiation through the casing layer 106. Therefore, the size of the radiation shielding layer 114 can be reduced.

The first electrode 108 is in electrical communication with the radiation source layer 102. The first electrode 108 can be electrically insulated from the casing layer 106, the radiation shielding layer 114, and any other electrically conductive layers in the nuclear battery 110 besides the radiation source layer 102. In various examples, the first electrode 108 has a positive polarity.

The second electrode 110 is in electrical communication with the casing layer 106. The second electrode 110 is electrically insulated from the radiation shielding layer 114 and the radiation source layer 102. In various examples, the second electrode 110 has a negative polarity.

The beta radiation emitted by the radiation source layer 102 can be directly used to produce electrical energy without the need to first produce thermal energy. For example, the beta radiation emitted by the radiation source material 102 can traverse through the first electrical insulator layer 104 to the casing layer 106. The traversal of the beta radiation can create a voltage potential between the radiation source layer 102 and the casing layer 106. For example, the beta radiation can comprise electrons which can be transferred to the casing layer 106.

The first electrical insulator layer 104 can be configured with a thickness to create a desirable electrical resistance between the radiation source material 102 and the casing layer 106 while enabling traversal of the beta radiation through the first electrical insulator layer 104 such that the voltage potential can be created. Thus, due to the electrical communication between the first electrode 108 and the radiation source layer 102 and the electrical communication between the second electrode 110 and the casing layer 106, a voltage potential is present between the first electrode 108 and the second electrode 110 when the radiation source layer 102 emits beta radiation. Alpha radiation emitters that are used in typical RTGs would not be able to achieve a desirable voltage potential since alpha radiation only travels very short distances in solid materials.

The second electrical insulator layer 112 is disposed over the casing layer 106. For example, the second electrical insulator layer 112 can be in direct contact with and surround the casing layer 106. The second electrical insulator layer 112 can comprise a composition and thickness suitable to provide a desired electrical resistance between the casing layer 106 and the radiation shielding layer 114 such that the radiation shielding layer 114 is inhibited from interfering with the electric potential generated between the casing layer 106 and the radiation source layer 102. For example, the second electrical insulator layer 112 can comprise a metal oxide. In various examples, the second electrical insulator layer 112 can comprise magnesium oxide, aluminum oxide, diamond, or a combination thereof. The second electrical insulator layer 112 can be thermally conductive. Thus, heat generated in the casing layer 106 by inhibition traversal of beta radiation be conducted to the radiation shielding layer 114.

The radiation shielding layer 114 is disposed over the second electrical insulator layer 112. For example, the radiation shielding layer 114 can be in direct contact with and surround the second electrical insulator layer 112. The radiation shielding layer 114 can comprise a composition and thickness suitable to inhibit gamma radiation from traversing through the radiation shielding layer 114. For example, the radiation shielding layer 114 can comprise a metal or metal alloy. In various examples, the radiation shielding layer 114 can comprise tungsten, a tungsten alloy, iron, an iron alloy, uranium, a uranium alloy, or a uranium compound. The radiation shielding layer 114 can be in thermal communication with the casing layer 106. The radiation shielding layer 114 can produce thermal energy by inhibiting additional beta radiation and/or Bremsstrahlung radiation from the casing layer 106 from traversing through the radiation shielding layer 114.

The thermal energy harvesting device 116 is in physical contact with the radiation shielding layer 114 and configured to receive thermal energy from the radiation shielding layer 114 and convert the thermal energy into electrical energy. For example, the thermal energy harvesting device 116 can comprise a thermocouple. In various examples, the thermal energy from the radiation shielding layer 114 can be harvested in a manner used by typical RTGs.

Since the radiation shielding layer 116 can be heated by the thermal energy, the thermal insulation layer 118 can be disposed over the radiation shielding layer 114 such that convection losses of thermal energy from the nuclear battery 100 are reduced thereby increasing the efficiency of the nuclear battery 100. For example, the thermal insulation layer 118 can be in direct contact with and surround the radiation shielding layer 116. The thermal insulation layer 118 can comprise fiberglass, silica, carbon, other thermally insulating materials, and combinations thereof.

As described herein, the nuclear battery 100 can generate electrical energy from converting thermal energy into electrical energy utilizing the thermal energy harvesting device 116 and by directly from the emission of beta radiation from the radiation source layer 102. The nuclear battery 100 can be configured to output at least 0.1 watt per cubic centimeter of volume of the nuclear battery (watt/$cm^3$) from the first and second electrodes, 108 and 110, such as, for example, at least 0.5 watt/$cm^3$, at least 1 watt/$cm^3$, at least 2 watt/$cm^3$, at least 10 watts/$cm^3$, or at least 50 watt/$cm^3$.

The nuclear battery 100 can be used in variety of applications where a substantially constant power source is desired. The nuclear battery 100 can be used to power computers or communication devices of military equipment, or it can be used to power unmanned vehicles such as planes or submarines, or it can be used in civil applications such as electric cars to provide longer driving range by powering auxiliary functions such as interior heating or cooling.

Powering unmanned vehicles can also allow these vehicles to operate on conditions that are not normally achievable. Since the nuclear battery 100 does not need air (e.g., oxygen) in opposed to currently used combustion engines to power, vehicles can travel at higher altitudes and/or at colder temperatures.

Figure 2:
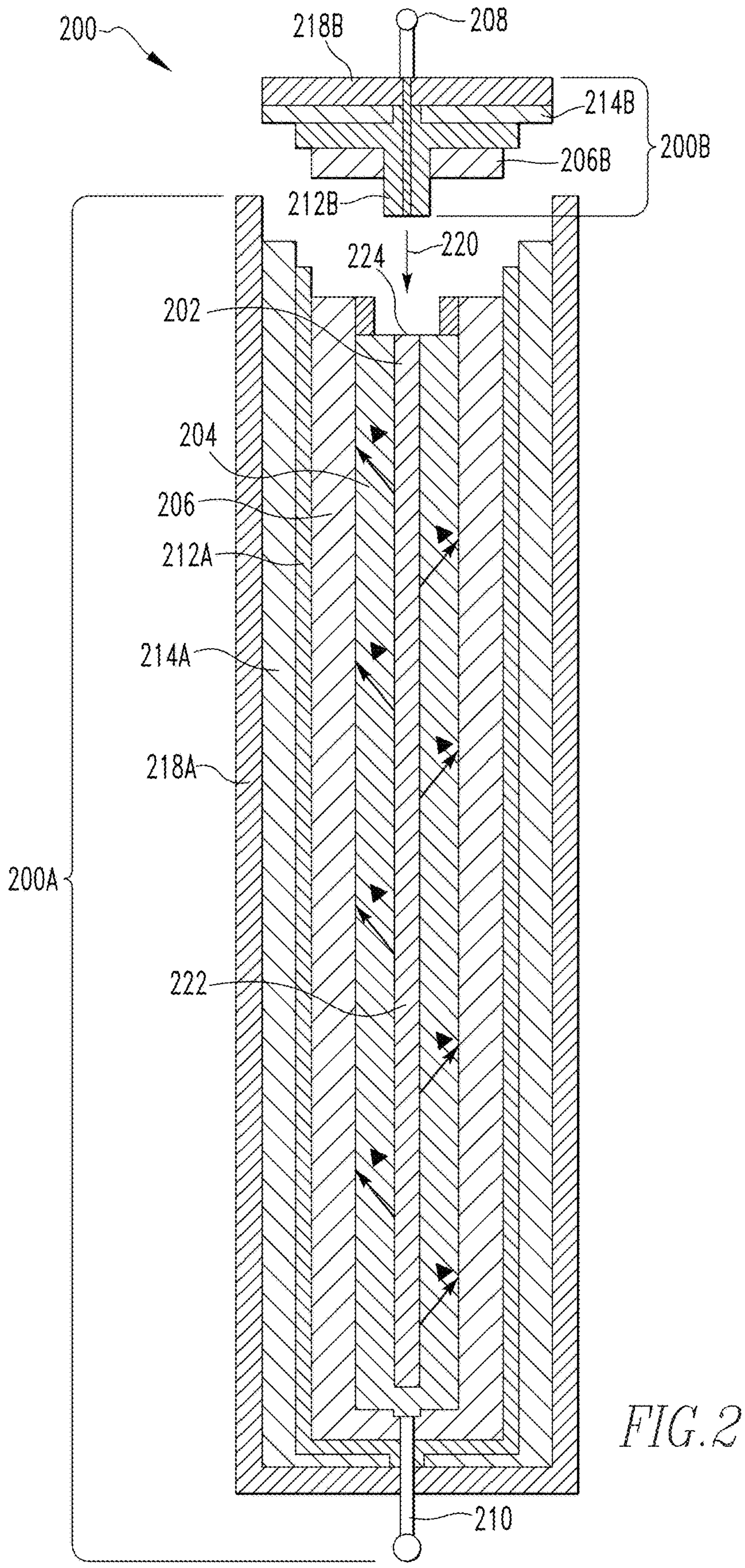
FIG. 2 is a partial cross-sectional exploded side view of a nuclear battery assembly according to the present disclosure.

Referring to FIG. 2, an exploded view of a nuclear battery assembly 200 comprising at least two components (e.g., subassemblies), a first component **200*a* and a second component 200*b*, is provided. The first component 200*a* comprises a first electrical insulator layer 204*a* defining a cavity 222 and a first casing layer 206*a* disposed over the first electrical insulator layer 204*a*. The cavity 222 is sized to receive radiation source material. For example, the first electrical insulator layer 204*a* can comprise a tubular shape thereby defining a cylindrical shaped cavity 222 or the first electrical insulator layer 204*a* can comprise a box shape thereby defining a rectangular shaped cavity 222**.

Optionally, the first component **200*a* can comprise a second electrical insulator layer 212*a* disposed over the first casing layer 206*a*, a first radiation shielding layer 214*a* disposed over the second electrical insulator layer 212*a*, a second electrode 210, and a first thermal insulation layer 218*a* disposed over the first radiation shielding layer 214*a*. The second electrode 210 can be configured in electrical communication with the first casing layer 206 and can be electrically insulated from the first radiation shielding layer 214*a* by the second electrical insulator layer 212*a***.

The second component **200*b* (e.g., a cover, a sealing component) comprises a third electrical insulator layer 214*b* and the second casing layer 206*b*. Optionally, the second component 200*b* comprises a second radiation shielding layer disposed over the second electrical insulator layer 212*b*, a first electrode 208, and a second thermal insulation layer 218*b* disposed over the first radiation shielding layer 214*b*. The first electrode 208 can be configured to be in communication with the radiation source layer 202 in the assembly 200. After assembly, a voltage potential is present between the first electrode 208 and the second electrode 210** when the radiation source layer emits beta radiation.

Figure 3:
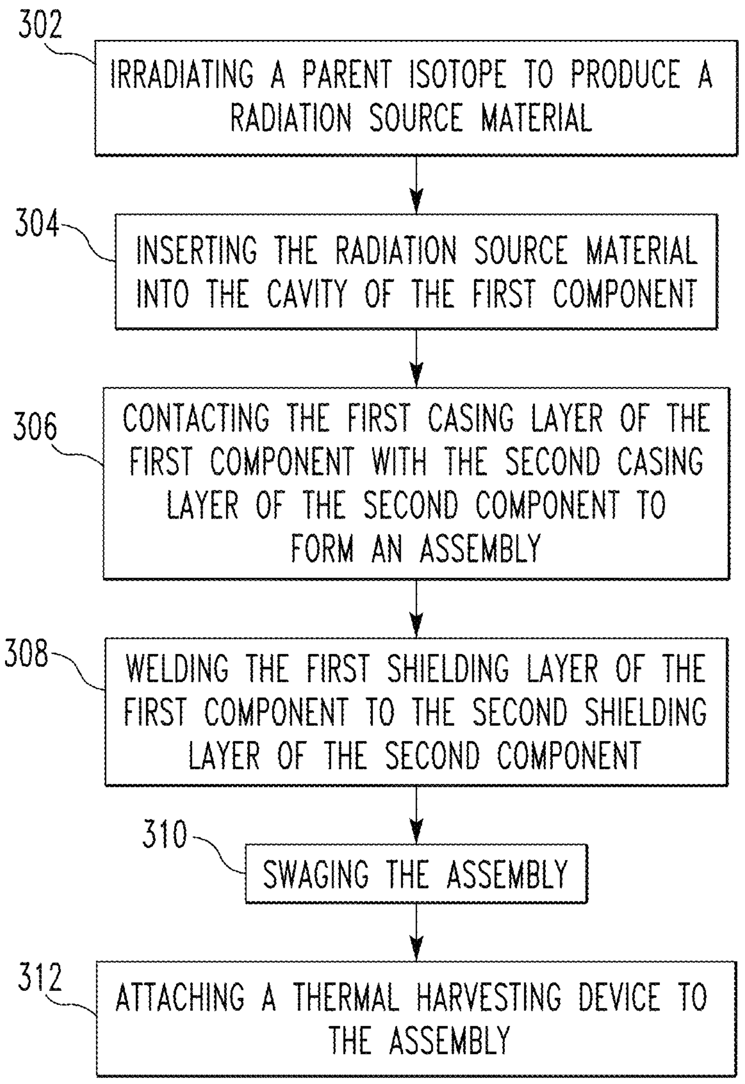
FIG. 3 is a flow diagram for a method of manufacture of a nuclear battery according to the present disclosure.

Referring to FIG. 3, a flow chart for a method of producing a nuclear battery from the assembly 200 is provided. As illustrated at step 302, the method can comprise irradiating a parent isotope material to produce the radiation source material. For example, the parent isotope material can be neutron activated by the irradiation, such as, for example, the parent isotope can comprise thulium-169, which can be neutron activated to thulium-170 by irradiation. In various examples, irradiation can occur according to U.S. Patent Application No. 2016/0012928, U.S. Pat. Nos. 10,446,283, and/or 10,714,222, which are each hereby incorporated by reference. In certain examples, the irradiation can occur within a nuclear reactor in a nuclear power plant.

At step 304, the method comprises inserting the radiation source material into the cavity 222 defined within a first component to form the radiation source layer 202. For example, the radiation source material can be inserted into the cavity 222 through an opening 224 in the first component **200*a***. In various examples, the radiation source material is a powder, a wire, or a combination thereof. For example, the radiation source material may be a powder.

At step 306, the first casing layer **206*a* of the first component 200*a* is contacted with the second casing layer 206*b* of the second component 200*b* to form an assembly. In various examples, the first radiation shielding layer 214*a* and the second radiation shielding layer 214*b* can be contacted with one another and electrical communication between the first electrode 208 and the radiation source layer 202 can be established. For example, the second component 200*b* and the first component 200*a* can be oriented as shown in FIG. 2 and moved towards one another until they contact. For example, the second component 200*b* can be moved towards the first component 200*a* in direction 200 until the two components, 200*a* and 200*b*, contact one another. In various examples, the first component 200*a* can be moved towards the second component 200*b***.

Regardless of the movement, the first radiation shielding layer **214*a* and the second radiation shielding layer 214*b* can be sealed together to seal the radiation source layer 202 within the assembly 200 at step 308. For example, the first radiation shielding layer 214*a* and the second radiation shielding layer 214*b* can be welded together utilizing laser welding, friction welding, or a combination thereof. In various examples, the second component 200*b* can comprise threads and the first component 200*a* can comprise threads wherein the two components, 200*a* and 200*b*, are screwed together. Sealing the radiation source layer 202 within the assembly 200 can inhibit environmental contaminants from penetrating the interior of the assembly 200 and inhibit the radiation source layer from leaking out of the assembly 200** and the nuclear battery produced therefrom. Additionally, the first casing layer 206*a* and the second casing layer 206*b* can be welded together. In various examples utilizing threads enables replacement of the radiation source layer 202, for example, when the radiation output of the radiation source layer 202 drops below a desired level.

The assembly 200 can be swaged to form a nuclear battery at step 310. In various examples, swaging reduces a cross-sectional dimension of the assembly 200 and increases surface contact between the radiation source layer 202 and the first electrical insulator layer 204, which can minimize gaps that would impede the transport of the beta particles from the radiation source layer 202 to the first casing layer 206. Swaging can ensure the desired density and thickness of the radiation source layer 202, the first electrical insulator layer 204, and the second electrical insulator layer 212*a* is achieved. In various examples, the assembly 200 comprises a longitudinal axis and swaging applied a compressive to the assembly 200 towards the longitudinal axis.

At step 312 a thermal energy harvesting device, such as thermal energy harvesting device 116 as shown in FIG. 1, can be attached to the nuclear battery such that the thermal harvesting device is in physical contact with the first radiation shielding layer 214*a*. At step 312, wiring may be attached to the first electrode 208 and the second electrode 210 as well.

Figure 4:
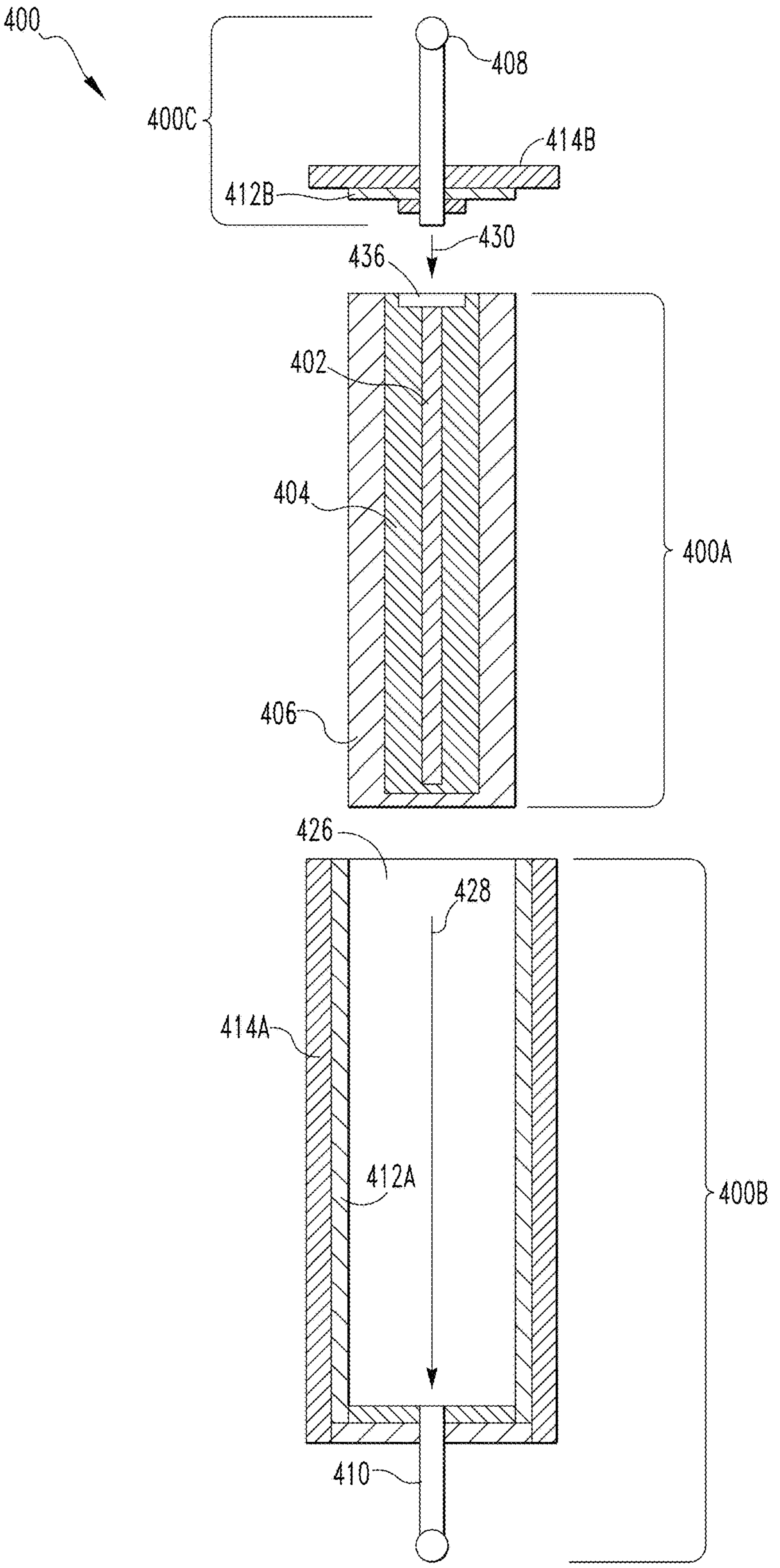
FIG. 4 is a partial cross-sectional exploded side view of a nuclear battery assembly according to the present disclosure.

Referring to FIG. 4, an exploded view of a nuclear battery assembly 400 comprising at least three components (e.g., subassemblies), a first component 400*a*, a second component 400*b*, and a third component 400*c*, is provided. The first component 400*a* comprises a parent isotope material 402, a first electrical insulator layer 404 disposed over the parent isotope material 402, and a casing layer 406 disposed over the first electrical insulator layer 404. The first component 400*a* also comprise an electrical contact 436 configured to facilitate electrical communication between the parent isotope material 402 and/or radiation source layer formed therefrom and a first electrode 408. The electrical contact 436 can be electrically insulated from the casing layer 406.

The second component 400*b* comprises the second electrical insulator layer 412*a* defining the cavity 426 and a first radiation shielding layer 414*a* disposed over the third electrical insulator layer 412*b*. Optionally, the second component 400*b* comprises the second electrode 410 and a first thermal insulation layer (not shown in FIG. 4) disposed over the first radiation shielding layer 414*a*. The second electrode 410 is configured to be in electrical communication with the casing layer 406 when the first component 400*a* is received by the cavity 426.

The third component 400*c* comprises a third electrical insulator layer 412*b* and a second radiation shielding layer 414*b* disposed over the electrical insulating layer 412*b*. Optionally, the third component 400*c* comprises the second electrode 408, which is configured to be in electrical communication with the electrical contact 436, and a second thermal insulation layer (not shown in FIG. 4) disposed over the second radiation shielding layer 414*b*.

Referring to FIG. 5, a flow chart for a method of manufacturing a nuclear battery from the assembly 400 is provided. At step 502, the first component 400*a* including the parent isotope material 402 is irradiated to form a radiation source layer. The irradiation of the parent isotope can occur similarly to step 302 in FIG. 3. In various examples, the first component 400*a* can be disposed within a removable container while irradiating the first component 400*a*. For example, at shown in FIG. 6, the first component 400*a* can be cylindrical shaped and a removable container 632 (e.g., a thimble) can define a cylindrical shaped cavity 634 suitable to receive the first component 400*a*. The first component 400*a* can be placed in the cylindrical shaped cavity 634 and the removable container 632 containing the first component 400*a* can be placed in a nuclear reactor to irradiate the first component 400*a*. Then, the first component 400*a* can be removed from the nuclear reactor and prepared for additional manufacturing steps. Forming the radiation source layer while the parent isotope material 402 is in the first component 402 can limit radiation exposure during subsequent manufacturing steps since the radiation source layer can already be sealed within the first component 400*a* by the casing layer 406. In various examples, the parent isotope material 402 can be a wire, a powder, or a combination thereof. For example, the parent isotope material 402 can be a wire.

In order to facilitate radiation at step 402, the casing layer 406 can comprise a metal or metal alloy with a low neutron cross section, which can avoid producing radioisotopes in the casing that may reduce the electrical voltage potential caused by beta emissions from the resulting radiation source layer. Additionally, the metal or metal alloy of the casing layer 406 can comprise a metal or metal alloy that does not significantly change mechanical properties after prolonged neutron and gamma radiation exposure. For example, the casing layer 406 can comprise aluminum, an aluminum alloy, magnesium, a magnesium alloy, beryllium, or a beryllium alloy.

Referring back to FIG. 5, after irradiation at step 502, the first component 400*a* can be inserted into the cavity 426 defined within the second component 400*b* to form a subassembly. The first radiation shielding layer 414*a* of the second component 400*b* and the second radiation shielding layer 414*b* of the third component 400*c* can be contacted together to form the assembly 400 at step 506. The first radiation shielding layer 414*a* and the second radiation shielding layer 414*b* can be sealed together at step 508, similar to the process at step 308.

The assembly 400 can be swaged to form the nuclear battery at step 510. In various examples, swaging reduces a cross-sectional dimension of the assembly 400 and increases surface contact between the casing layer 406 and the second electrical insulator layer 412*a*, which can increase thermal transfer from the first component 400*a* to the radiation shielding layer 414*a* during operation of the nuclear battery. Swaging can ensure the desired density and thickness of the radiation source layer 402, the first electrical insulator layer 404, and the second electrical insulator layer 412*a* is achieved.

At step 512 a thermal energy harvesting device, such as thermal energy harvesting device 116 as shown in FIG. 1, can be attached to the nuclear battery such that the thermal harvesting device is in physical contact with the first radiation shielding layer 414*a*. At step 512, wiring may be attached to the first electrode 408 and the second electrode 410 as well.

The methods of manufacturing a nuclear battery according to the present disclosure enable a beta radiation based nuclear battery to be safely and efficiently manufactured. The methods of manufacturing a nuclear battery according to the present disclosure can minimize radiation exposure to operators performing final assembly tasks around the nuclear battery.

Various aspects of the invention according to the present disclosure include, but are not limited to, the aspects listed in the following numbered clauses.

1. A method of manufacturing a nuclear battery, the method comprising: inserting a radiation source material into a cavity defined within a first component to form a radiation source layer, the first component comprising a first electrical insulator layer defining the cavity and a first casing layer disposed over the first electrical insulator layer; contacting the first casing layer with a second casing layer of a second component to form an assembly, the second component comprising a second electrical insulator layer and the second casing layer disposed in contact with the second electrical insulator layer; and swaging the assembly to form the nuclear battery.

2. The method of clause 1, wherein the radiation source material comprises thulium, a thulium isotope, strontium, a strontium isotope, or a combination thereof; the first and second casing layer each comprise a metal or metal alloy; and the first and second electrical insulator layers each comprise a metal oxide.

3. The method of any one of clauses 1-2, wherein the first and second casing layers comprise aluminum, an aluminum alloy, magnesium, a magnesium alloy, beryllium, or a beryllium alloy.

4. The method of any one of clause 1-3, wherein the first and second electrical insulator layers each comprise magnesium oxide, aluminum oxide, diamond, or a combination thereof 5. The method of any one of clause 1-4, wherein the radiation source material is a powder, a wire, or a combination thereof.

6. The method of any one of clauses 1-5, further comprising irradiating a parent isotope material to produce the radiation source material.

7. The method of any one of clauses 1-6, wherein swaging reduces a cross-sectional dimension of the assembly and increases surface contact between the radiation source layer and the first electrical insulator layer.

8. The method of any one of clauses 1-7, wherein the first component comprises: a third electrical insulator layer disposed over the first casing layer; and a first radiation shielding layer disposed over the third electrical insulator layer; the second component comprises a second radiation shielding layer disposed over the second electrical insulator layer; and the method further comprises welding the first radiation shielding layer and the second radiation shielding layer together to seal the radiation source layer within the assembly.

9. The method of clause 8, wherein the first component comprises: a first electrode in electrical communication with the first casing layer; and a first thermal insulation layer disposed over the first radiation shielding layer; and the second component comprises a second electrode configured to be in electrical communication with radiation source layer in the assembly, wherein a voltage potential is present between the first electrode and the second electrode when the radiation source layer emits beta radiation; and a second thermal insulation layer disposed over the first radiation shielding layer.

10. The method of any one of clauses 8-9, further comprising attaching a thermal energy harvesting device to the nuclear batter such that the thermal harvesting device is in physical contact with the first radiation shielding layer.

11. The method of any one of clauses 8-10, wherein the first and second radiation shielding layers each comprises tungsten, a tungsten alloy, iron, an iron alloy, uranium, or a uranium alloy.

12. The method of any one of clauses 1-11, wherein the nuclear battery is plate shaped or rod shaped.

13. A method of manufacturing a nuclear battery, the method comprising: irradiating a parent isotope material in a first component to form a radiation source layer, the first component comprising the parent isotope material, a first electrical insulator layer disposed over the parent isotope material, and a casing layer disposed over the first electrical insulator layer; inserting the first component comprising the radiation source layer into a cavity defined within a second component to form a subassembly, the second component comprising a third electrical insulator layer defining the cavity, and a first radiation shielding layer disposed over the third electrical insulator layer; contacting the first radiation shielding layer of the second component with a second radiation shielding layer of a third component to form an assembly, the third component comprising a second electrical insulator layer and the second radiation shielding layer in contract with the second electrical insulator layer; welding the first radiation shielding layer and the second radiation shielding layer together; and swaging the assembly to form the nuclear battery.

14. The method of clause 13, wherein the radiation source layer comprises thulium, a thulium isotope, strontium, a strontium isotope, or a combination thereof; the first and second casing layer each comprise a metal or metal alloy; the first and second electrical insulator layers each comprise a metal oxide; and the first and second radiation shielding layers each comprise tungsten, a tungsten alloy, iron, an iron alloy, uranium, or a uranium alloy.

15. The method of any one of clauses 13-14, wherein swaging reduces a cross-sectional dimension of the second assembly and increases surface contact between the first casing layer and the third electrical insulator layer.

16. The method of any one of clauses 13-15, wherein the second component comprises: a first electrode configured to be in electrical communication with the casing layer in the assembly; and a first thermal insulation layer disposed over the first radiation shielding layer; and the third component comprises: a second electrode configured to be in electrical communication with the radiation source layer in the assembly, wherein a voltage potential is present between the first electrode and the second electrode when the radiation source layer emits beta radiation; and a second thermal insulation layer disposed over the first radiation shielding layer.

17. The method of any one of clauses 13-16, further comprising attaching a thermal energy harvesting device to the nuclear battery such that the thermal harvesting device is in physical contact with the first radiation shielding layer.

18. The method of any one of clauses 13-17, wherein the nuclear battery is plate shaped or rod shaped.

19. The method of any one of clauses 13-18, wherein the first component is disposed within a removable container while irradiating the parent isotope material in the first component to form the radiation source layer.

20. The method of any one of clauses 12-19, wherein the parent isotope material is irradiated within a nuclear reactor in a nuclear power plant.

Various features and characteristics are described in this specification to provide an understanding of the composition, structure, production, function, and/or operation of the invention, which includes the disclosed methods and systems. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a method or system that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

As used in this specification, particularly in connection with layers, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a layer "applied over" a substrate does not preclude the presence of another layer or other layers of the same or different composition located between the applied layer and the substrate. Likewise, a second layer "applied over" a first layer does not preclude the presence of another layer or other layers of the same or different composition located between the applied second layer and the applied first layer.

Whereas particular examples of this invention have been described above for purposes of illustration, it will be evident to those skilled in the art that numerous variations of the details of the present invention may be made without departing from the invention as defined in the appended claims.

What is claimed is:

1. A method of manufacturing a nuclear battery, the method comprising:

inserting a radiation source material into a cavity defined within a first component to form a radiation source layer, the first component comprising:
- a first electrical insulator layer defining the cavity; and
- a first casing layer disposed over the first electrical insulator layer;

contacting the first casing layer with a second casing layer of a second component to form an assembly, the second component comprising:
- a second electrical insulator layer; and
- the second casing layer disposed in contact with the second electrical insulator layer; and swaging the assembly to form the nuclear battery.

2. The method of claim 1, wherein the radiation source material comprises thulium, a thulium isotope, strontium, a strontium isotope, or a combination thereof;

the first and second casing layers each comprise a metal or metal alloy; and the first and second electrical insulator layers each comprise a metal oxide.

3. The method of claim 1, wherein the first and second casing layers comprise aluminum, an aluminum alloy, magnesium, a magnesium alloy, beryllium, or a beryllium alloy.

4. The method of claim 1, wherein the first and second electrical insulator layers each comprise magnesium oxide, aluminum oxide, diamond, or a combination thereof.

5. The method of claim 1, wherein the radiation source material is a powder, a wire, or a combination thereof.

6. The method of claim 1, further comprising irradiating a parent isotope material to produce the radiation source material.

7. The method of claim 1, wherein swaging reduces a cross-sectional dimension of the assembly and increases a surface contact between the radiation source layer and the first electrical insulator layer.

8. The method of claim 1, wherein the first component comprises:

a third electrical insulator layer disposed over the first casing layer; and a first radiation shielding layer disposed over the third electrical insulator layer;

the second component comprises a second radiation shielding layer disposed over the second electrical insulator layer; and the method further comprises welding the first radiation shielding layer and the second radiation shielding layer together to seal the radiation source layer within the assembly.

9. The method of claim 8, wherein the first component comprises:

a first electrode in electrical communication with the first casing layer; and a first thermal insulation layer disposed over the first radiation shielding layer; and the second component comprises a second electrode configured to be in an electrical communication with radiation source layer in the assembly, wherein a voltage potential is present between the first electrode and the second electrode when the radiation source layer emits a beta radiation; and a second thermal insulation layer disposed over the first radiation shielding layer.

10. The method of claim 8, further comprising attaching a thermal energy harvesting device to the nuclear batter such that the thermal harvesting device is in physical contact with the first radiation shielding layer.

11. The method of claim 8, wherein the first and second radiation shielding layers each comprises tungsten, a tungsten alloy, iron, an iron alloy, uranium, or a uranium alloy.

12. The method of claim 1, wherein the nuclear battery is plate shaped or rod shaped.

* * * * *